(12) United States Patent
Nakamura et al.

(10) Patent No.: US 9,981,641 B2
(45) Date of Patent: May 29, 2018

(54) BODY RESERVOIR ASSEMBLY

(71) Applicants: NISSIN KOGYO CO., LTD., Ueda-shi, Nagano (JP); HONDA MOTOR CO., LTD., Minato-Ku, Tokyo (JP)

(72) Inventors: Motoyasu Nakamura, Ueda (JP); Yoshiteru Matsunaga, Ueda (JP); Kazuaki Murayama, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 14/389,001

(22) PCT Filed: Mar. 29, 2013

(86) PCT No.: PCT/JP2013/059716
§ 371 (c)(1),
(2) Date: Sep. 29, 2014

(87) PCT Pub. No.: WO2013/147247
PCT Pub. Date: Oct. 3, 2013

(65) Prior Publication Data
US 2015/0068201 A1  Mar. 12, 2015

(30) Foreign Application Priority Data

Mar. 30, 2012 (JP) .................................. 2012-083144

(51) Int. Cl.
*B60T 11/22* (2006.01)
*B60T 13/66* (2006.01)
(Continued)

(52) U.S. Cl.
CPC ............... *B60T 11/22* (2013.01); *B60T 7/042* (2013.01); *B60T 8/4081* (2013.01);
(Continued)

(58) Field of Classification Search
CPC ........ B60T 7/042; B60T 8/4081; B60T 11/22; B60T 13/662; B60T 13/686; B60T 17/06
See application file for complete search history.

(56) References Cited

U.S. PATENT DOCUMENTS 4,185,750 A * 1/1980 Op den Camp ........ B60T 11/26
                                                          137/576
4,489,556 A    12/1984 Komorizono et al.
(Continued)

FOREIGN PATENT DOCUMENTS

CN    1441736 A    9/2003
EP    1447294 A1   8/2004
(Continued)

OTHER PUBLICATIONS

Office Action issued Jan. 12, 2016 in counterpart Chinese Application No. 201380016635.4.
(Continued)

*Primary Examiner* — Logan Kraft
(74) *Attorney, Agent, or Firm* — Carrier Blackman & Associates, P.C.; William D. Blackman; Jingli Wang (57) ABSTRACT

Provided is a body reservoir assembly whose height can be reduced. In the body reservoir assembly, the reservoir comprises: a recessed portion formed on a bottom surface of the reservoir; and a reservoir side connecting portion formed in the recessed portion and connected to a cylinder portion.

10 Claims, 5 Drawing Sheets

(51) Int. Cl.
*B60T 7/04* (2006.01)
*B60T 13/68* (2006.01)
*B60T 17/06* (2006.01)
*B60T 8/40* (2006.01)

(52) U.S. Cl.
CPC .......... *B60T 13/662* (2013.01); *B60T 13/686* (2013.01); *B60T 17/06* (2013.01)

(56) References Cited

U.S. PATENT DOCUMENTS

| | | | | |
|---|---|---|---|---|
| 4,615,175 | A * | 10/1986 | Ishiwata | B60T 11/22 |
| | | | | 264/318 |
| 5,957,545 | A * | 9/1999 | Sawada | B60T 11/26 |
| | | | | 303/1 |
| 6,550,591 | B2 * | 4/2003 | Honda | B60T 17/06 |
| | | | | 188/352 |
| 6,984,000 | B2 * | 1/2006 | Fraisse | B60T 8/4081 |
| | | | | 188/345 |
| 8,899,039 | B2 * | 12/2014 | Mouri | B60T 11/26 |
| | | | | 60/585 |
| 2003/0047990 | A1 | 3/2003 | Demersseman et al. | |

FOREIGN PATENT DOCUMENTS

| | | |
|---|---|---|
| JP | S58-152452 U | 10/1983 |
| JP | H03-76760 U | 7/1991 |
| JP | H03-076760 U | 7/1991 |
| JP | H06-22138 U | 3/1994 |
| JP | H1035469 A | 2/1998 |
| JP | 2004074837 A | 3/2004 |
| JP | 2004-276772 A | 10/2004 |
| JP | 2004276772 A | 10/2004 |
| JP | 2007-099057 A | 4/2007 |

OTHER PUBLICATIONS

Office Action of Nov. 2, 2015 to the counterpart European Application EP 13 769 378.4 from the European Patent Office.
Office Action dated Dec. 6, 2016 for counterpart Japanese Patent Application No. JP2014-508223.
Office Action dated Jul. 20, 2017, issued in the counterpart Japanese Patent Application No. 2014-508223.

* cited by examiner

BODY RESERVOIR ASSEMBLY

TECHNICAL FIELD

The present invention relates to a body reservoir assembly in which a reservoir is connected to an upper surface of a body, and a fluid can move between the reservoir and an inside of the body.

BACKGROUND ART

Conventionally, for a vehicle braking system, there is known a structure (a body reservoir assembly) in which a reservoir is connected to an upper surface of a body used for a master cylinder (see Patent Literature 1).

RELATED ART DOCUMENT

Patent Literature

Patent Literature 1: JP 2007-99057 A

DISCLOSURE OF THE INVENTION

Problem to be Solved by the Invention

However, for the above-described body reservoir assembly, as the reservoir is arranged on the upper surface of the body, the height is not reduced and a space is required.

The present invention has been developed in view of the above situation, and an object of the present invention is to provide a body reservoir assembly whose height can be reduced.

Means for Solving the Problem

According to the present invention developed to solve such a problem, a body reservoir assembly includes: a body; and a reservoir which is connected to an upper surface of the body and allows a fluid to move to/from an inside of the body, wherein the reservoir includes: a recessed portion formed on a bottom surface of the reservoir; and a reservoir side connecting portion formed in the recessed portion and connected to the body.

According to the above structure, as the body and the reservoir are connected in the recessed portion, the height can be reduced.

It is preferable that the body includes a body side connecting portion formed on the upper surface of the body and connected to the reservoir, wherein the reservoir side connecting portion and the body side connecting portion are connected to each other through a fixing component in a state of being superimposed on each other in a side view.

It is preferable that the reservoir includes a contact portion where the bottom surface of the reservoir and the upper surface of the body contact with each other, wherein the reservoir side connecting portion is connected to the body at a position higher than the contact portion.

By this structure, as the body and the reservoir are connected at a position higher than the contact portion, the height can be further reduced.

Arrangement may be made such that the reservoir includes a partitioning portion formed on the recessed portion, wherein the reservoir and the body communicate with each other on both sides partitioned by the partitioning portion.

By this structure, as the partitioning portion is formed on the recessed portion, the inside of the reservoir can be appropriately partitioned. Further, as the partitioning portion is formed on the recessed portion, the partitioning portion can prevent the stiffness from a decrease caused by providing the recessed portion.

It is preferable that the reservoir is formed by welding a reservoir upper at an upper portion and a reservoir lower at a lower portion, the reservoir lower including the recessed portion and the reservoir side connecting portion.

By this structure, as the recessed portion and the reservoir side connecting portion are formed on the reservoir lower, and the recessed portion and the reservoir side connecting portion are disposed lower than the welded surface of the reservoir, manufacturing is easier than a case that a recessed portion and a reservoir side connecting protruded portion are formed, straddling both the reservoir upper and the reservoir lower.

SUMMARY OF THE INVENTION

According to the present invention, the height of a body reservoir assembly can be reduced.

EMBODIMENT FOR CARRYING OUT THE INVENTION

Figure 1:
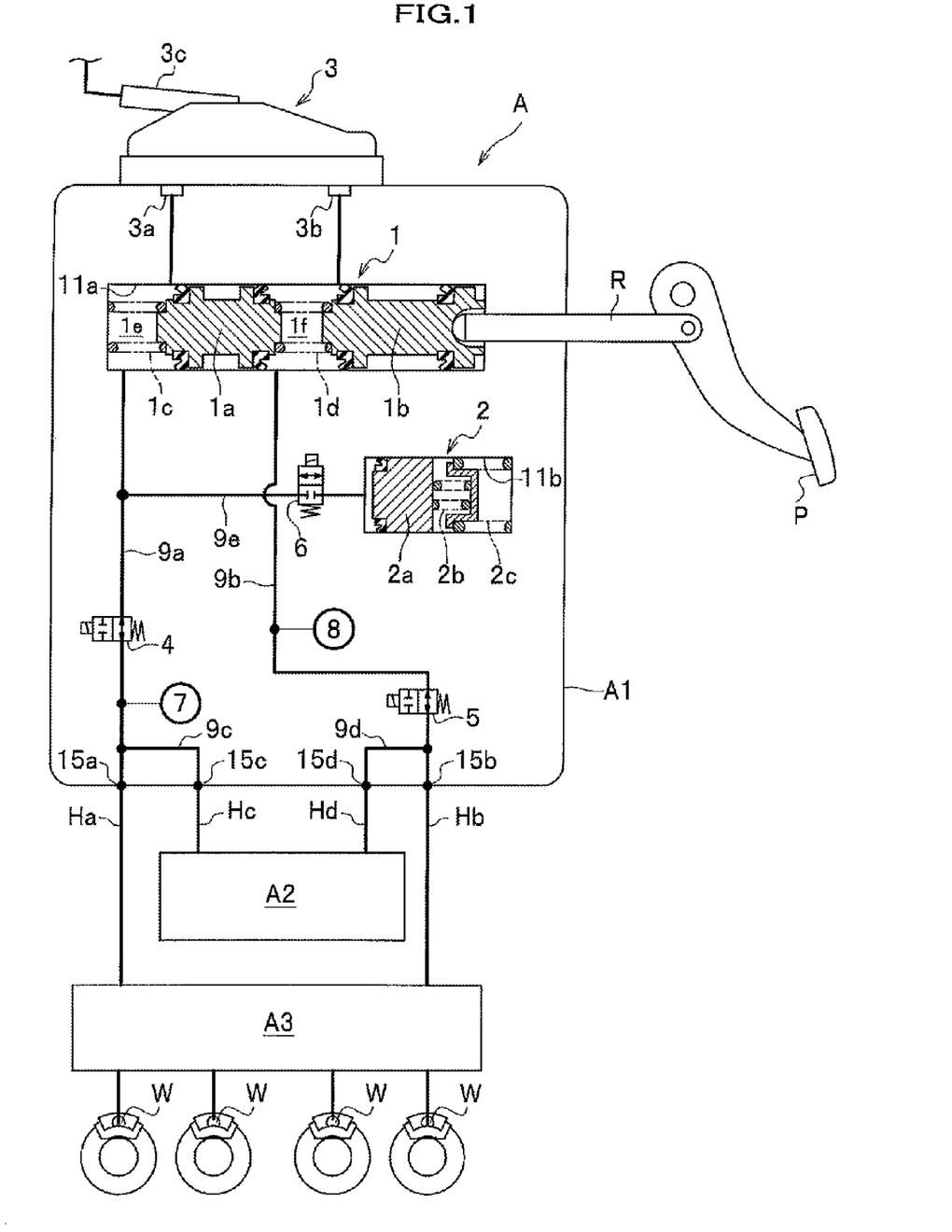
FIG. 1 is a schematic configuration diagram of a vehicle braking system including a master cylinder device, according to an embodiment of the present invention, to which a housing is attached.

A vehicle braking system A, shown in FIG. 1, includes both a by-wire braking system that operates at a start of a power device (an engine, a motor, or the like) and a hydraulic braking system that operates in an emergency, at a time when the power device stops, or at other time. The vehicle braking system A includes a master cylinder device A1 that generates a hydraulic brake pressure by brake pedal effort on a brake pedal (brake operator) P, a motor cylinder device A2 that generates a hydraulic brake pressure using an electric motor (not shown), and a vehicle stability assist device A3 (hereinafter, referred to as 'a hydraulic control device A3') for assisting stabilization of vehicle behavior. The master cylinder device A1, the motor cylinder device A2, and the hydraulic control device A3 are arranged as different units and communicate with each other through external pipes.

The vehicle braking system A can be mounted on a vehicle only with an engine (internal combustion engine) as a power device, and also on a hybrid vehicle also using a motor, an electric vehicle only with an electric motor as a power device, a fuel cell electric vehicle, or the like.

The master cylinder device A1 includes a tandem master cylinder 1, a stroke simulator 2, a reservoir 3, normally-open shutoff valves (electromagnetic valves) 4, 5, a normally-closed shutoff valve (electromagnetic valve) 6, pressure sensors 7, 8, main hydraulic passages 9*a*, 9*b*, communicating hydraulic passages 9*c*, 9*d*, and a branch hydraulic passage 9*e*.

The master cylinder 1 converts a brake pedal effort on the brake pedal P into a hydraulic brake pressure, and includes a first piston 1*a* disposed on the bottom wall side of a first cylinder hole 11*a*, a second piston 1*b* connected to a push rod R, a first return spring 1*c* disposed between the first piston 1*a* and the bottom wall of the first cylinder hole 11*a*, and a second return spring 1*d* disposed between the pistons 1*a*, 1*b*. The second piston 1*b* is connected to the brake pedal P through the push rod R. The both pistons 1*a*, 1*b* slide, receiving the pedal effort on the brake pedal P, and pressurize a brake fluid in pressure chambers 1*e*, 1*f*. The pressure chambers 1*e*, 1*f* communicate with the main hydraulic passages 9*a*, 9*b*.

The stroke simulator 2 generates a pseudo operational reaction force, and includes a piston 2*a* sliding within the second cylinder hole 11*b*, and larger and smaller return springs 2*b*, 2*c* urging the piston 2*a*. The stroke simulator 2 communicates with the pressure chamber 1*e* through the main hydraulic passage 9*a* and the branch hydraulic passage 9*e* to operate by a hydraulic brake pressure generated by the pressure chamber 1*e*.

The reservoir 3 is a container for reserving the brake fluid and includes fluid supply ports 3*a*, 3*b* connected to the master cylinder 1, and a pipe connecting port 3*c* to which a hose extending from a main reservoir (not shown) is connected.

The normally-open shutoff valves 4, 5 open and close the main hydraulic passages 9*a*, 9*b*, and both are electromagnetic valves of a normal-open type. The one normally-open shutoff valve 4 opens and closes the main hydraulic passage 9*a* in a section from an intersection of the main hydraulic passage 9*a* and the branch hydraulic passage 9*e* to an intersection of the main hydraulic passage 9*a* and the communicating hydraulic passage 9*c*. The other normally-open shutoff valve 5 opens and closes the main hydraulic passage 9*b* on the upstream side of an intersection of the main hydraulic passage 9*b* and the communicating hydraulic passage 9*d*.

The normally-closed shutoff valve 6 opens and closes the branch hydraulic passage 9*e* and is an electromagnetic valve of a normal closed type.

The pressure sensors 7, 8 detect the magnitudes of hydraulic brake pressure, and are attached to sensor attaching openings (not shown) communicating with the main hydraulic passages 9*a*, 9*b*. The one pressure sensor 7 is disposed on the downstream side of the normally-open shutoff valve 4, and detects a hydraulic brake pressure generated by the motor cylinder device A2 when the normally-open shutoff valve 4 is closed (i.e. in a state that the main hydraulic passage 9*a* is shut off). The other pressure sensor 8 is disposed on the upstream side of the normally-open shutoff valve 5, and detects a hydraulic brake pressure generated by the master cylinder 1 when the normally-open shutoff valve 5 is closed (i.e. in a state that the main hydraulic passage 9*b* is shut off). Information obtained by the pressure sensors 7, 8 is output to an electric control unit (ECU) not shown.

The main hydraulic passages 9*a*, 9*b* are hydraulic passages originating at the master cylinder 1. Output ports 15*a*, 15*b*, which are the end points of the main hydraulic passages 9*a*, 9*b*, are connected to pipe members Ha, Hb reaching the hydraulic control device A3.

The communicating hydraulic passages 9*c*, 9*d* are hydraulic passages extending from input ports 15*c*, 15*d* to the main hydraulic passages 9*a*, 9*b*. The input ports 15*c*, 15*d* are connected to pipe members Hc, Hd extending to the motor cylinder device A2.

The branch hydraulic passage 9*e* branches from the one main hydraulic passage 9*a* and extends to the stroke simulator 2.

The master cylinder device A1 communicates with the hydraulic control device A3 through the pipe members Ha, Hb. When the normally-open shutoff valves 4, 5 are in an open state, a hydraulic brake pressure generated by the master cylinder 1 is input to the hydraulic control device A3 through the main hydraulic passages 9*a*, 9*b* and the pipe members Ha, Hb.

Though not shown, the motor cylinder device A2 is provided with a slave piston sliding in a slave cylinder, an actuator mechanism having an electric motor and a driving force transmitting portion, and a reservoir for reserving the brake fluid in the slave cylinder. The electric motor operates, based on a signal from an electric control unit not shown. The driving force transmitting portion converts the rotation force of the electric motor to forward and backward motion and transmits the motion to the slave piston. The slave piston slides within the slave cylinder by the driving force of the electric motor, and pressurizes the brake fluid in the slave cylinder. A hydraulic brake pressure generated by the motor cylinder device A2 is input to the master cylinder device A1 through the pipe members Hc, Hd, and is input to the hydraulic control device A3 through the communicating hydraulic passages 9*c*, 9*d* and the pipe members Ha, Hb. A hose extending from a main reservoir (not shown) is connected to the reservoir.

The hydraulic control device A3 is configured such as to be able to execute antilock brake control (ABS control) for reducing slippage of wheels, skid control and traction control for stabilizing the behavior of the vehicle, and the like, and is connected to wheel cylinders W, W, . . . through pipe members. Incidentally, though not shown, the hydraulic control device A3 includes a hydraulic unit provided with electromagnetic valves, a pump, etc., a motor for driving the pump, an electronic control unit for controlling the electromagnetic valves, the motor, and the like.

The operation of the vehicle braking system A will be briefly described below.

In a normal state in which the vehicle braking system A normally functions, the normally-open shutoff valves 4, 5 are in a valve closed state, and the normally-closed shutoff valve 6 is in a valve open state. In this state, when the brake pedal P is operated, a hydraulic brake pressure generated by the master cylinder 1 is not transmitted to the wheel cylinders W but is transmitted to the stroke simulator 2 so that the piston 2*a* is displaced, the stroke of the brake pedal P is thereby permitted, and a pseudo operational reaction force is applied to the brake pedal P.

Further, when a brake pedal effort on the brake pedal P is detected by a stroke sensor, not shown, or the like, the electric motor of the motor cylinder device A2 is driven so that the slave piston is displaced and the brake fluid in the cylinder is thereby pressurized.

The electronic control unit, not shown, compares the hydraulic brake pressure output from the motor cylinder device A2 (hydraulic brake pressure detected by the pressure sensor 7) and the hydraulic brake pressure output from the master cylinder 1 (the hydraulic brake pressure detected by the pressure sensor 8), and controls the number of revolutions of the electric motor and the like, based on a result of the comparison.

The hydraulic brake pressure generated by the motor cylinder device A2 is transmitted through the hydraulic control device A3 to the wheel cylinders W, W, . . . , and the respective wheel cylinders W operate, thereby applying a braking force to the respective wheels.

Incidentally, in a state that the motor cylinder device A2 does not operate (for example, in a case of unavailability of electric power, emergency, or the like), both the normally-open shutoff valves 4 and 5 become into a valve open state and the normally-closed shutoff valve 6 becomes into a valve closed state, and accordingly, a hydraulic brake pressure generated by the master cylinder 1 is transmitted to the wheel cylinders W, W, . . . .

A concrete structure of the master cylinder device A1 will be described below.

Figure 2A:
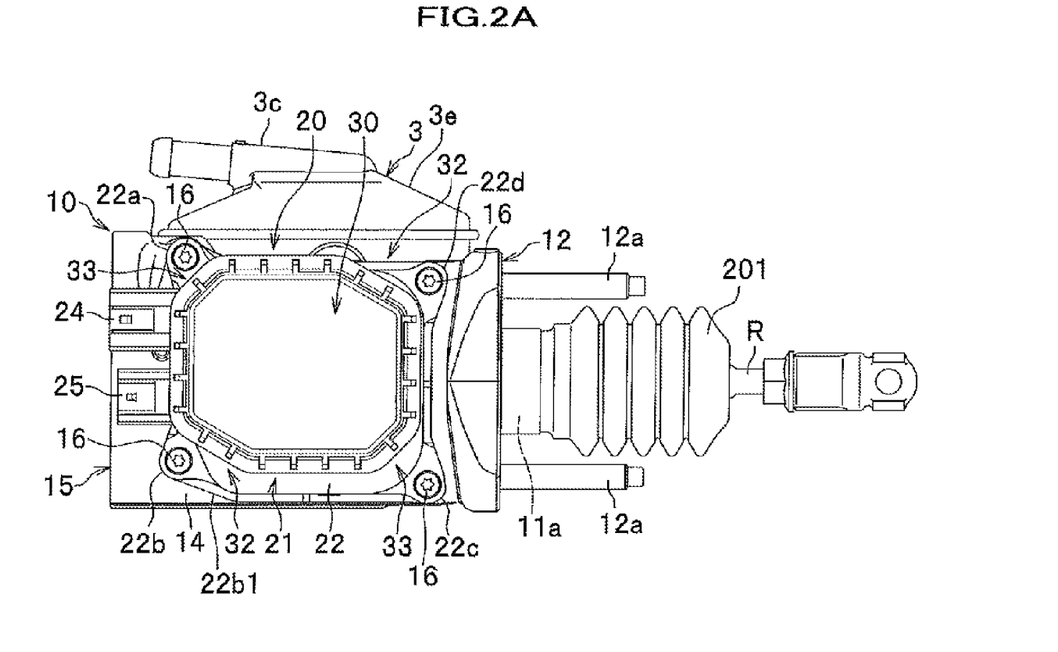
FIG. 2A is a side view of the master cylinder device.
Figure 2B:
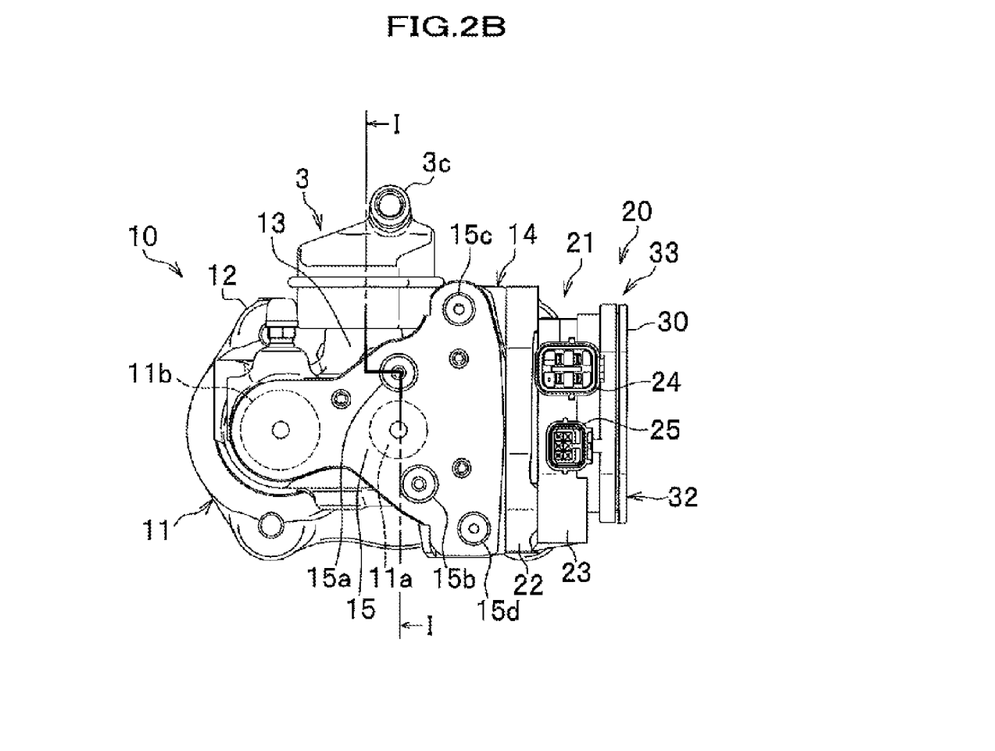
FIG. 2B is a front view of the same.

The master cylinder device A1 in the present embodiment is structured by attaching the above-described various components to the inside or outside of the base body 10 in FIGS. 2A and 2B, and covering by the housing 20 electric components (the normally-open shutoff valves 4, 5, the normally-closed shutoff valve 6, and the pressure sensors 7, 8 (see FIG. 1)), which are electrically operated. Incidentally, mechanical components and the like may be housed in the housing 20.

The base body 10 is a cast product of an aluminum alloy, and is provided with a cylinder portion 11 (see FIG. 2B, the same hereinafter), a vehicle body fixing portion 12, a reservoir fitting portion 13 (see FIG. 2B, the same hereinafter), a housing fitting portion 14, and a pipe connecting portion 15. Further, holes (not shown) to be the main hydraulic passages 9a. 9b and the branch hydraulic passage 9e, and the like are formed within the base body 10.

The cylinder portion 11 is provided with the first cylinder hole 11a for the master cylinder and the second cylinder hole 11b for the stroke simulator (both shown by dashed lines in FIG. 2B). The cylinder holes 11a, 11b are both in a bottomed cylindrical shape, open at the vehicle body fixing portion 12, and extending toward the pipe connecting portion 15. The components (the first piston 1a, the second piston 1b, the first return spring 1c, and the second return spring 1d) constructing the master cylinder 1 (see FIG. 1) are inserted in the first cylinder hole 11a, and the components (the piston 2a, and the return springs 2b, 2c) constructing the stroke simulator 2 are inserted in the second cylinder hole 11b.

The vehicle body fixing portion 12 is fixed to a fixing part on the vehicle side fixing part, such as a toe board (not shown). The vehicle body fixing portion 12 is formed in a flange shape at the posterior surface portion of the base body 10. The marginal portion (the portion expanding from the cylinder portion 11) of the vehicle body fixing portion 12 is provided with a bolt insertion hole (not shown), and a bolt 12a is fixed there.

As shown in FIG. 2B, the reservoir fitting portion 13 is a part serving as the fitting seat of the reservoir 3. The reservoir fitting portion 13 is formed in two pieces (only one piece is shown) at the upper face portion of the base body 10. The reservoir fitting portion 13 is provided with a reservoir union port. Incidentally, the reservoir 3 is fixed to the base body 10 through a connecting portion (not shown) protruding on the upper face of the base body 10.

The reservoir union port is in a cylindrical shape and communicates with the first cylinder hole 11a through a hole extending from the bottom surface thereof toward the first cylinder hole 11a. The reservoir union port is s a fluid supply port, not shown, protruding from the lower portion of the reservoir 3. The main body of the container of the reservoir 3 is mounted on the upper end of the reservoir union port.

The housing fitting portion 14 is arranged on the side surface of the base body 10. The housing fitting portion 14 is a part serving as the fitting seat of the housing 20. The housing fitting portion 14 is in a flange shape. The upper end portion and the lower end portion of the housing fitting portion 14 are provided with female screws, not shown, and fitting screws 16 are screw-engaged with these female screws, as shown in FIG. 2A, to thereby fix the housing 20 to the housing fitting portion 14 (the side surface of the 10).

Though not shown, the housing fitting portion 14 is provided with three valve attaching holes and two sensor attaching holes. The normally-open shutoff valves 4, 5 and the normally-closed shutoff valve 6 (see FIG. 1) are attached to the three attaching holes, and the pressure sensors 7, 8 (see FIG. 1) are attached to the two sensor attaching holes.

The pipe connecting portion 15 is a part serving as a pipe fitting seat, and is arranged on the anterior surface portion of the base body 10, as shown in FIG. 2A. The pipe connecting portion 15 is, as shown in FIG. 2B, provided with two output ports 15a, 15b and two input ports 15c, 15d. The pipe members Ha, Hb (see FIG. 1) reaching the hydraulic control device A3 are connected to the output ports 15a, 15b. The pipe members Hc, Hd (see FIG. 1) reaching the motor cylinder device A2 are connected to the input ports 15c, 15d.

The housing 20 includes a housing main body 21 that liquid tightly covers components (the normally-open shutoff valves 4, 5, the normally-closed shutoff valve 6, and the pressure sensors 7, 8, see FIG. 1, the same hereinafter) attached to the housing fitting portion 14, and a lid member 30 attached to the opening of the housing main body 21.

Though not shown, within the circumferential wall portion of the housing main body 21, electromagnetic coils for driving the normally-open shutoff valves 4, 5 and the normally-closed shutoff valve 6 are housed, and in addition, busbars reaching the electromagnetic coils and the pressure sensors 7, 8 are housed.

A flange portion 22 is a part pressure-fitted to the housing fitting portion 14 (see FIG. 2B, the same hereinafter). The flange portion 22 is formed such as to continue to boss portions 22a-22d as fitting screw portions and expand to the outer side of the housing main body 21.

The respective boss portions 22a-22d are arranged at the four corners of the housing main body 21 to meet the positions of the female screws of the housing fitting portion 14. Metal collars are buried in the respective boss portions 22a-22d, and screw inserting holes (screw holes) functioning as insertion holes are formed in the collars. Fitting screws 16 (see FIG. 2A, the same hereinafter) as fastening members are respectively inserted through the screw inserting holes. In fixing the housing 20 to the housing fitting portion 14 of the base body 10 (see FIG. 2A), the fixing can be carried out by evenly fastening the respective fitting screws 16.

As shown in FIG. 2A, a flange portion 22b1, of the flange portion 22, continuous to the boss portion 22b has an inclined lower surface. The inclination of the flange portion 22b1 corresponds to the inclination of a later-described first inclined marginal portion 232 of a circumferential wall portion 23. Thus, space saving is attained.

Incidentally, the surface, of the flange portion 22, facing the housing fitting portion 14 of the flange portion 22 is provided with a circumferential recession, not shown, to which a sealing member of a synthetic rubber is attached. The fitting screws 16 are fastened so that this sealing member tightly contacts with the housing fitting portion 14 and thereby functions to hold the liquid tightness of the housing main body 21.

The reservoir 3 has fluid supply openings 3a, 3b (see FIG. 1), and in addition, a pipe connecting port 3c as shown in FIG. 2A and a connecting flange not shown. The pipe connecting port 3c protrudes forward from a container main body 3e reserving the brake fluid. A hose extending from a main reservoir (not shown) is connected to the pipe connecting port 3c. The connecting flange is protruded on the lower surface of the container main body 3e, superposed on the reservoir fitting portion 13 (see FIG. 2B), and fixed to the connecting portion of the base body 10 by a spring pin, not shown.

Figure 3:
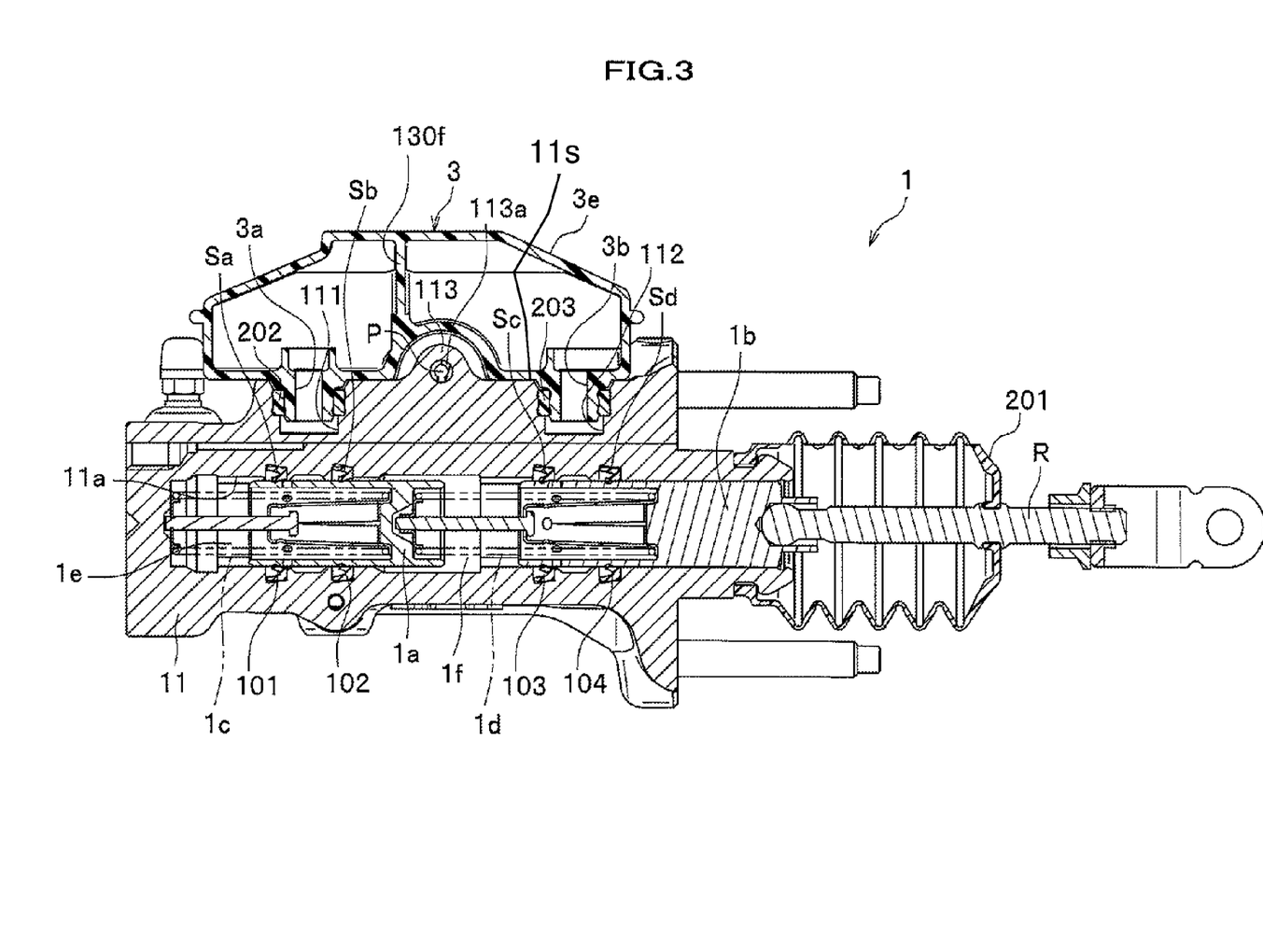
FIG. 3 is a cross-sectional view taken along arrow I-I in FIG. 2.

In the following, the inner structure of the cylinder portion 11 will be described, referring to FIG. 3. In FIG. 3, the return springs 1c, 1d (see FIG. 1) are not shown. As shown in FIG. 3, annular recessed portions 101, 102 formed on the inner circumferential surface of the cylinder portion 11 are respectively provided with annular sealing members Sa, Sb. These sealing members Sa, Sb perform liquid-tight sealing between the inner circumferential surface of the cylinder portion 11 and the outer circumferential surface of the first piston 1a. Likewise, annular recessed portions 103, 104 formed on the inner circumferential surface of the cylinder portion 11 are respectively provided with annular sealing members Sc, Sd. These sealing members Sc, Sd perform liquid-tight sealing between the inner circumferential surface of the cylinder portion 11 and the outer circumferential surface of the second piston 1b. That is, the master cylinder 1 is a so-called plunger type master cylinder, which is provided with the sealing members Sa-Sd on the cylinder portion 11 side. The sliding surfaces of such arranged first piston 1a and second piston 1b, the sliding surfaces sliding on the inner circumferential surface of the cylinder portion 11, are coated by plating. The end portion, on the brake pedal P side, of the cylinder portion 11, and the cylinder portion 11 side of the push rod R, are covered by a boot 201 of a rubber.

(Body Reservoir Assembly)

In the following, a body reservoir assembly according to the present embodiment of the present invention will be described in detail. As shown in FIG. 3, the cylinder portion 11 and the reservoir 3 are connected to each other to construct a body reservoir assembly.

(Reservoir)

Figure 5A:
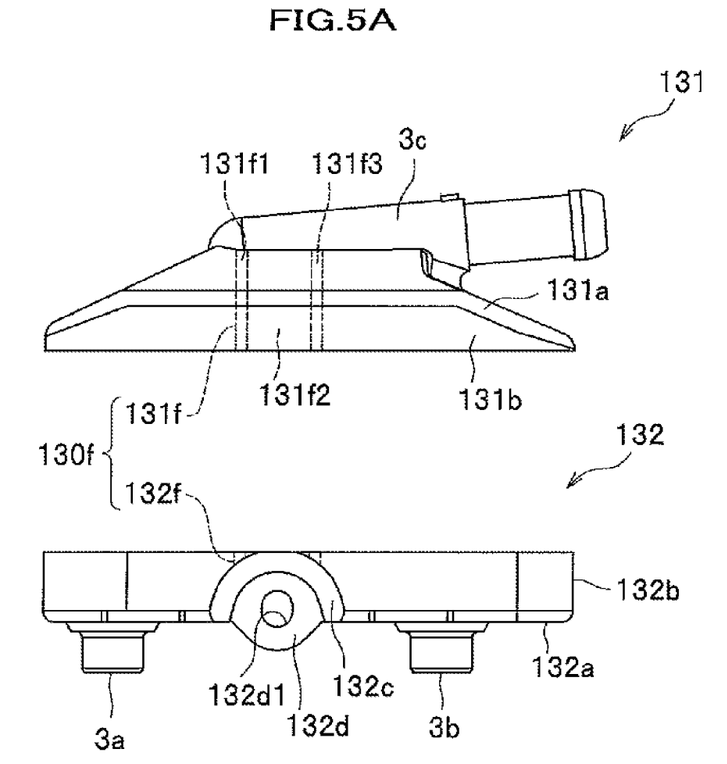
FIG. 5A is an exploded view of the reservoir in a side view.
Figure 5B:
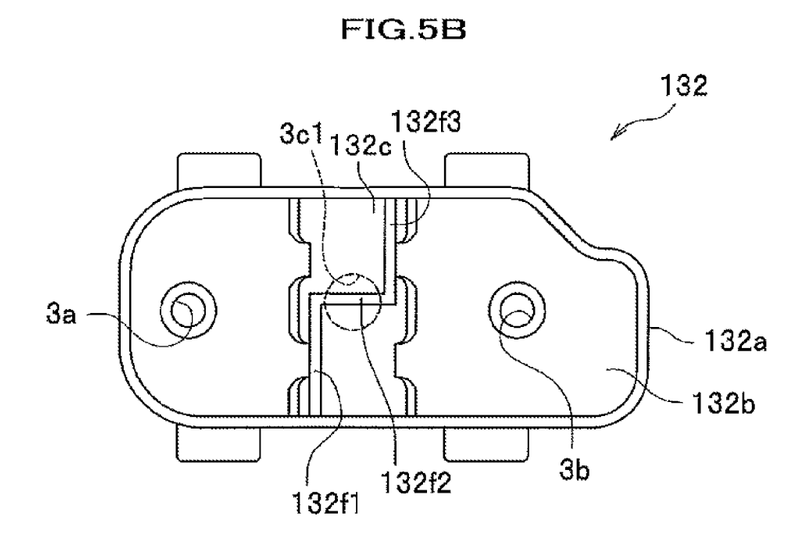
FIG. 5B is a view of the reservoir from above.

As shown in FIGS. 5A and 5B, the reservoir 3 is formed by welding a reservoir upper 131 and a reservoir lower 132.

As shown in FIG. 5A, the reservoir upper 131 has an upper surface portion 131a and a circumferential surface portion 131b in a rectangular frame shape in a plan view extended downward from the circumferential margin of the upper surface portion 131a, wherein the upper surface portion 131a is provided with a pipe connecting port 3c. Further, the reservoir upper 131 has an upper partitioning portion 131f. The upper partitioning portion 131f is in a crank shape integrally formed by a horizontal plate portion 131f1, a vertical plate portion 131f2, and a horizontal plate portion 131f3, and the opening end 3c1 of the pipe connecting port 3c is located above a vertical plate portion 132f1. The outer end portions of the horizontal plate portions 131f1, 131f3 are formed such as to be continuous to the circumferential surface portion 131b, wherein the lower end of the upper partitioning portion 131f is formed at the same height as the lower end of the circumferential surface portion 131b. The upper end of the upper partitioning portion 131f is formed such as to be continuous to the upper surface portion 131a, except the part at the opening end 3c1 of the pipe connecting port 3c.

As shown in FIGS. 5A and 5B, the reservoir lower 132 has a bottom surface portion 132a and a circumferential surface portion 132b in a rectangular frame shape in a plan view extended upward from the circumferential margin of the bottom surface portion 132a, wherein the bottom surface portion 132a is provided with a recessed portion 132c extending to the both surfaces, the surfaces facing each other, of the circumferential surface portion 132b. In other words, the recessed portion 132c extends along a direction perpendicular to the line connecting fluid supply ports 3a, 3b. The bottom surface portion 132a excluding the recessed portion 132c is in a flat shape, and the portion excluding the circumferential portion around the fluid supply ports 3a, 3b and the recessed portion 132c between the fluid supply ports 3a, 3b is a contact portion, according to the present invention, in contact with the upper surface of the cylinder portion 11. The recessed portion 132c is in a shape of a curved surface, and in more detail, an arch shape. In the recessed portion 132c, formed is a pair of reservoir side connecting protruded portions 132d separated from each other with respect to the direction perpendicular to the line connecting the fluid supply ports 3a, 3b, the pair of reservoir side connecting protruded portions 132d being an example of a reservoir side connecting portion, and the reservoir side connecting protruded portions 132d are provided with respective hole portions 132d1. The pair of reservoir side connecting protruded portions 132d are formed on the inner side of the both surfaces, the surfaces facing each other, of the circumferential surface portion 132b. Further, although the lower end margins of the reservoir side connecting protruded portions 132d protrude lower than the bottom surface portion 132a, the centers of the hole portions 132d1 are located higher than the bottom surface portion 132a.

Further, a lower partitioning portion 132f is formed, extending from the recessed portion 132c of the bottom surface portion 132a of the reservoir lower 132. Similarly to the upper partitioning portion 131f, the lower partitioning portion 132f is in a crank shape integrally formed by a horizontal plate portion 132f1, a vertical plate portion 132f2, and a horizontal plate portion 132f3. The outer end portions of the horizontal plate portions 132f1, 132f3 are formed such as to be continuous to the circumferential surface portion 132b, wherein the upper end of the lower partitioning portion 132f is formed at the same height as the upper end of the circumferential surface portion 132b.

The above-described reservoir 3 is formed by welding the lower end of the circumferential surface portion 131b of the reservoir upper 131 and the upper end of the circumferential surface portion 132b of the reservoir lower 132. That is, the recessed portion 132c and the reservoir side connecting protruded portion 132d are disposed lower than the welded surface. Further, the lower end of the upper partitioning portion 131f and the upper end of the lower partitioning portion 132f are welded to form the partitioning portion 130f in a crank shape. In order that the brake fluid supplied from the pipe connecting port 3c into the reservoir 3 can generate a braking force by the other system when a failure has occurred on one system only (leakage of the brake fluid, or the like), the brake fluid is reserved being divided into the both sides of the partitioning portion 130f. This partitioning portion 130f partitions the space in the reservoir 3 substantially into halves. The fluid supply ports 3a, 3b are disposed respectively on the both sides of the partitioning portion 130f on the bottom surface portion 132a, protruding downward from the bottom surface portion 132a.

(Cylinder Portion)

Figure 4:
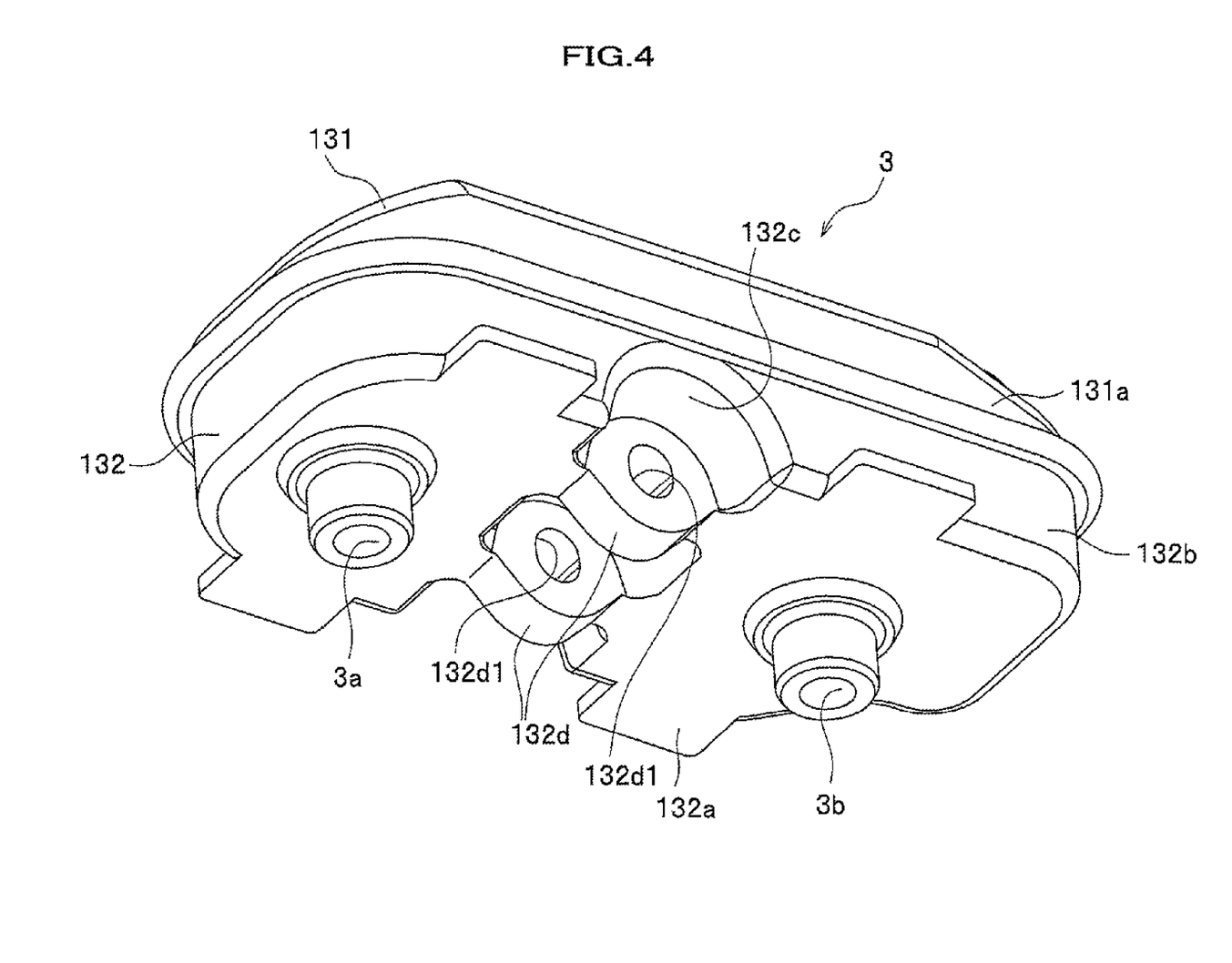
FIG. 4 is a perspective view of a reservoir in a view from below.

As shown in FIG. 3, ports 111, 112 are formed on the upper surface of the cylinder portion 11 as the body. The ports 111, 112 are recessed portions in a cylindrical shape where the fluid supply ports 3a, 3b are housed. A body side connecting protruded portion 113, which is an example of a body side connecting portion, is formed between the ports 111, 112, and the body side connecting protruded portion 113 is provided with a hole portion 113a. The body side connecting protruded portion 113 is protruded from the upper surface of the cylinder portion 11, and is disposed between the paired reservoir side connecting protruded portions 132d, 132d (see FIG. 4). The center of the hole portion 113a is located higher than the upper end margin of the ports 111, 112, and is also located higher than a contact portion where the bottom surface of the reservoir lower portion 132 contacts the upper surface 11S of the body (see FIG. 3). A pair of recessed portions for housing the lower ends of the reservoir side connecting protruded portions 132d, 132d are provided on the both sides of the body side connecting protruded portion 113 on the upper surface of the cylinder portion 11. The upper surface of the cylinder portion 11 between the ports 111, 112, excluding the above-described body side connecting protruded portion 113 and the recessed portion, is on the same plane in common with the plane of the upper end margin of the ports 111, 112.

Regarding the reservoir 3, in a state that the bottom surface portion 132a (see FIG. 4) is mounted on the upper surface of the cylinder portion 11, the fluid supply ports 3a, 3b are housed in the ports, 111, 112 through respective seal members 202, 203 in a hollowed cylindrical shape, and the reservoir side connecting protruded portions 132d, 132d (see FIG. 4) are superimposed on the body side connecting recessed portion 103 in a side view. In this state, a fixing component P is inserted through the hole portions 132d1, 103a to thereby connect the reservoir 3 and the cylinder portion 11 to each other so that a body reservoir assembly is obtained. As the fixing component P, a spring pin, a hollowed bar, a solid bar, a screw, or the like can be used.

According to the present embodiment of the present invention, for the body reservoir assembly, the cylinder portion 11 and the reservoir 3 are connected in the recessed portion 132c so that the height of the body reservoir assembly can be reduced.

Further, for the body reservoir assembly according to the present embodiment of the present invention, the cylinder portion 11 and the reservoir 3 are connected at a higher position than the bottom surface portion 132a, which is the contact portion, so that the height of the body reservoir assembly can be further reduced.

Further, for the body reservoir assembly according to present embodiment of the present invention, as the partitioning portion 132f is formed on the recessed portion 132c, the inside of the reservoir 3 can be appropriately partitioned. Still further, as the partitioning portion 132f is formed on the recessed portion 132c, a decrease in the stiffness caused by providing the recessed portion 132c can be prevented by the partitioning portion 132f.

Further, for the body reservoir assembly according to the present embodiment of the present invention, as the flat bottom surface portion 132a of the reservoir 3 is in contact with the upper surface of the cylinder portion 11, it is prevented that the brake fluid is reserved in a state of being unable to move to the cylinder portion 11, at a position lower than the fluid supply ports 3a, 3b in the reservoir 3.

Still further, for the body reservoir assembly according to the present embodiment of the present invention, the recessed portion 132c, the reservoir side connecting protruded portion 132d, and the partitioning portion 132f are formed on the reservoir lower 132, and the recessed portion 132c and the reservoir side connecting protruded portion 132d are disposed on the lower side of the welded surface of the reservoir 3. Accordingly, manufacturing is easier compared with a case that the recessed portion 132c, the reservoir side connecting protruded portion 132d, and the partitioning portion 132f are formed, straddling both the reservoir upper 131 and the reservoir lower 132.

An embodiment of the present invention has been described above, however, the present invention is not limited thereto and can be changed and modified, as appropriate, within a scope without departing from the spirit of the present invention. For example, a single reservoir side connecting protruded portion 32d may be provided, and the single reservoir side connecting protruded portion 32d may be disposed between a pair of body side connecting protruded portions 113. Further, as a modified example, the following arrangement may be made. That is, the recessed portion 132c is not formed on the bottom surface of the reservoir 3; the reservoir side connecting protruded portion 32d is formed on the lower side of the bottom surface of the reservoir 3; and the body side connecting protruded portion 113 is formed in the recessed portion formed on the body so that the such arranged body side connecting protruded portion 113 and the reservoir side connecting protruded portion 32d are connected to each other in the recessed portion.

DESCRIPTION OF REFERENCE SYMBOLS

3: reservoir
11: cylinder portion (body)
113: body side connecting protruded portion (body side connecting portion)
131: reservoir upper
132: reservoir lower
132c: recessed portion
132d: reservoir side connecting protruded portion (reservoir side connecting portion)
130f: partitioning portion

The invention claimed is:
1. A body reservoir assembly, comprising:
a body comprising a master cylinder portion, the body having an upper surface and having a recessed port formed therein extending downwardly from said upper surface for receiving a fluid supply port, the body having a connecting boss protruding upwardly from the upper surface and having a hole formed therein to receive a fastener, and
a reservoir having a hollow interior chamber formed therein, the reservoir being connected to the upper surface of the body, the reservoir having at least one fluid supply port extending downwardly thereon which fits nestingly into the recessed port of the body and allows a fluid to move between the interior chamber thereof and an inside of the body, the reservoir further having a recessed portion formed on a bottom surface thereof for receiving the connecting boss of the body therein,
the reservoir further including a reservoir side connecting portion comprising a pair of spaced-apart, downwardly protruding flanges formed in the recessed portion and connected to the body, the flanges being alignable with, and configured to receive an upper portion of the connecting boss therebetween, each of the flanges having a through hole formed therein to receive the fastener;

wherein:
the connecting boss defines a body side connecting portion formed on the upper surface of the body and connected to the reservoir;
the reservoir side connecting portion and the body side connecting portion are connected to each other by the fastener;
the reservoir includes a contact portion where the bottom surface of the reservoir contacts the upper surface of the body; and
a center of the hole formed in the connecting boss is located at a position higher than the contact portion.

2. The body reservoir assembly according to claim 1, wherein the reservoir includes a partitioning portion formed on the recessed portion and extending upwardly into an upper part of the reservoir, and
wherein the reservoir and the body communicate with each other on both sides partitioned by the partitioning portion.

3. The body reservoir assembly according to claim 2, wherein:
the partitioning portion is formed in a crank shape;
the partitioning portion includes a upper partitioning portion in an upper portion of the reservoir and a lower partitioning portion in a lower portion of the reservoir;
an upper end of the upper partitioning portion is formed such as to be continuous to the upper surface portion, except a part at an opening end of the pipe connecting port; and
the partitioning portion is formed by welding a lower end of the upper partitioning portion and an upper end of the lower partitioning portion.

4. The body reservoir assembly according to claim 1, wherein the reservoir is formed by welding a reservoir upper at an upper portion and a reservoir lower at a lower portion, the reservoir lower including the recessed portion and the reservoir side connecting portion.

5. The body reservoir assembly according to claim 1, wherein the recessed portion extends concavely inwardly from the bottom surface of the reservoir.

6. A body reservoir assembly comprising:
a body comprising a master cylinder portion having an upper surface and a connecting boss protruding upwardly from said upper surface and having a hole formed therein to receive a fastener; and
a reservoir having a hollow interior chamber formed therein, which is connected to the upper surface of the body and which allows a fluid to move between the interior chamber thereof and an inside of the body,
wherein the reservoir includes:
a pipe connecting port formed on an upper surface portion of the reservoir and protruding forward from the reservoir;
a recessed portion formed on a bottom surface of the reservoir, the bottom surface shaped substantially as a rectangle; and
a reservoir side connecting portion comprising a pair of spaced-apart, downwardly protruding flanges formed in the recessed portion and connected to the body, the flanges being alignable with, and configured to receive an upper portion of the connecting boss therebetween, each of the flanges having a through hole portion formed therein to receive the fastener,
wherein the reservoir includes a contact portion where the bottom surface of the reservoir contacts the upper surface of the body; and
wherein a center of the hole formed in the connecting boss is located at a position higher than the contact portion.

7. The body reservoir assembly according to claim 6, wherein the recessed portion is formed in a shape of an arch.

8. The body reservoir assembly according to claim 6, wherein the reservoir has a height, from the bottom surface of the reservoir to the upper surface portion of the reservoir, shorter than a long side of the bottom surface.

9. The body reservoir assembly according to claim 6, further comprising a partitioning portion disposed in the reservoir and formed in a crank shape, wherein:
the partitioning portion includes an upper partitioning portion in an upper portion of the reservoir and a lower partitioning portion in a lower portion of the reservoir;
an upper end of the upper partitioning portion is formed such as to be continuous to the upper surface portion of the reservoir, except a part at an opening end of the pipe connecting port; and
the partitioning portion is formed by welding a lower end of the upper partitioning portion and an upper end of the lower partitioning portion.

10. The body reservoir assembly according to claim 6, wherein the recessed portion extends concavely inwardly from the bottom surface of the reservoir.

* * * * *